(12) United States Patent
Tomlinson et al.

(10) Patent No.: US 6,250,064 B1
(45) Date of Patent: Jun. 26, 2001

(54) GAS TURBINE INLET AIR INTEGRATED WATER SATURATION AND SUPERSATURATION SYSTEM AND RELATED PROCESS

(75) Inventors: Leroy Omar Tomlinson, Schenectady; Anthony James George, Clifton Park, both of NY (US)

(73) Assignee: General Electric Co., Schenectady, NY (US)

(*) Notice: Subject to any disclaimer, the term of this patent is extended or adjusted under 35 U.S.C. 154(b) by 0 days.

(21) Appl. No.: 09/306,774

(22) Filed: May 7, 1999

(51) Int. Cl.⁷ .................................................. F02G 3/00
(52) U.S. Cl. ................................................... 60/39.05
(58) Field of Search ............................ 60/39.05, 39.02, 60/39.03, 39.53, 39.59

(56) References Cited

U.S. PATENT DOCUMENTS

| | | |
|---|---|---|
| 3,967,466 | 7/1976 | Edwards . |
| 3,990,427 | 11/1976 | Clinebell . |
| 3,994,630 | 11/1976 | Rodgers . |
| 4,005,572 | 2/1977 | Giffhorn . |
| 4,487,016 | 12/1984 | Schwarz et al. . |
| 4,648,711 | 3/1987 | Zachary . |
| 4,702,074 * | 10/1987 | Munk ................................ 60/39.511 |
| 4,765,142 | 8/1988 | Nakhamkin . |
| 4,870,816 | 10/1989 | Nakhamkin . |
| 4,872,307 | 10/1989 | Nakhamkin . |
| 4,885,912 | 12/1989 | Nakhamkin . |
| 4,928,478 | 5/1990 | Maslak . |
| 4,936,098 | 6/1990 | Nakhamkin . |
| 5,197,277 | 3/1993 | Ishigami et al. . |
| 5,329,758 | 7/1994 | Urbach et al. . |
| 5,347,806 | 9/1994 | Nakhamkin . |
| 5,386,688 | 2/1995 | Nakhamkin . |
| 5,442,904 | 8/1995 | Shnaid . |
| 5,622,044 * | 4/1997 | Bronicki et al. ................ 60/39.182 |
| 5,666,801 | 9/1997 | Rohrer . |
| 5,697,207 | 12/1997 | Cromer et al. . |
| 5,699,961 | 12/1997 | Ratnik et al. . |
| 5,711,677 | 1/1998 | Mui et al. . |
| 5,778,657 | 7/1998 | Ohtomo et al. . |
| 5,778,675 | 7/1998 | Nakhamkin . |
| 5,845,479 | 12/1998 | Nakhamkin et al. . |
| 5,867,977 * | 2/1999 | Zachary et al. ..................... 60/39.53 |
| 5,884,841 | 3/1999 | Ratnik et al. . |
| 5,934,063 | 8/1999 | Nakhamkin . |
| 6,012,279 * | 1/2000 | Hines ................................ 60/39.05 |

FOREIGN PATENT DOCUMENTS

| | | | |
|---|---|---|---|
| 0781909 A2 * | 2/1997 | (EP) | ............................. F02C/7/143 |
| 0 781 909 A2 | 7/1997 | (EP) . | |

* cited by examiner

Primary Examiner—Timothy S. Thorpe
Assistant Examiner—W Rodriguez
(74) Attorney, Agent, or Firm—Nixon & Vanderhye

(57) ABSTRACT

A gas turbine combustion air cooling system includes an intake a duct having an inlet region and an outlet, the duct adapted to supply ambient air to an inlet of a compressor; a first set of nozzles for spraying atomized water into the ambient air at a location adjacent the duct inlet; a second set of nozzles for spraying atomized water into the ambient air to supersaturate the ambient air at a location proximate the compressor inlet; and a control system for apportioning water to the first and second sets of nozzles.

16 Claims, 3 Drawing Sheets

US 6,250,064 B1

GAS TURBINE INLET AIR INTEGRATED WATER SATURATION AND SUPERSATURATION SYSTEM AND RELATED PROCESS

TECHNICAL FIELD

This invention relates to an integrated air saturation and supersaturation system for gas turbine combustion air.

BACKGROUND OF THE INVENTION

Known equipment to humidify gas turbine inlet (i.e., combustion) air for performance augmentation have included one or the other of the systems described below. These systems are generally used under high load conditions and relatively high ambient temperatures (over about 40° F.).

An evaporative cooler system includes an absorbtive media or other system located in a low velocity section of the air intake duct, and is supplied with water which is exposed to the air flowing through the media for evaporation of the water by energy in the air. The energy used for evaporating the water reduces the temperature of the air to near the saturation point, or wet bulb temperature. The reduced temperature of the air entering the gas turbine compressor increases the gas turbine temperature ratio and mass flow, thereby increasing gas turbine output and efficiency. This system does not have the ability to supersaturate the combustion air, however, without the potential for large water drop entrainment which potentially erodes the compressor blades.

An inlet fogging system includes a plurality of manifolds and nozzles that spray finely atomized water into the combustion air for the gas turbine. The fogging systems are located in the air intake duct and have the ability to humidify air to (or near) the saturation point and in most applications to supersaturate the air. Supersaturation of the air in the duct leads to the potential for the formation of large water drops that can erode compressor blades. Condensation of water in the intake duct also requires a drain system to dispose of the unwanted water. Water entrained in the air entering the compressor does cool the air being compressed to reduce compressor power consumption and thereby increase gas turbine power output. Inlet foggers are difficult to control, however, since measurement of supersaturation is impossible.

A compressor intercooling system involves cooling of air between sections of an air compressor, reducing the compressor power consumption and thereby increasing gas turbine power output. Cooling of the air by intercoolers have included (1) heat exchangers where energy removed from the air is rejected to an external media; and (2) evaporative intercoolers in which water is evaporated into the air being compressed. Heat exchanger type intercoolers remove energy from the gas turbine system which must be replaced by energy from fuel burned, so they significantly decrease efficiency, albeit they do increase power output. Evaporative intercoolers perform essentially the same function as inlet air supersaturation, but evaporative intercooling is performed in interstage pressure vessels, which are costly and which introduce pressure drops which degrade gas turbine performance. Moreover, intercooling systems typically must be used under all operating conditions.

BRIEF SUMMARY OF THE INVENTION

This invention relates to an integrated air saturation and supersaturation system for gas turbine combustion air to provide maximum augmentation of power and efficiency during high load operation at ambient air temperature in excess of a practical minimum temperature of about 40° F. (4.44° C.).

In the exemplary embodiments, the integral system includes a spray type or media type evaporative cooler which introduces atomized water into the gas turbine inlet air in the inlet region of the intake duct (well upstream of the compressor inlet) which humidifies the air with water at or near the saturation point. At the same time, water spray nozzles are located in the gas turbine air intake duct in close proximity to the compressor inlet, at the outlet end of the intake duct, which introduce finely atomized water to the previously humidified combustion air to supersaturate it and thus cool the compressor as explained further herein.

The system also includes a control arrangement to deliver and manage the saturation and supersaturation water introduced into the gas turbine inlet or combustion air to optimize the gas turbine performance augmentation within the overall limits of the gas turbine components.

Accordingly, in its broader aspects, the present invention relates to a gas turbine combustion air cooling system comprising a duct having an inlet region and an outlet, said duct adapted to supply ambient air to an inlet of a compressor; a first set of nozzles for spraying atomized water into the ambient air at a location adjacent the duct inlet; a second set of nozzles for spraying atomized water into the ambient air to supersaturate the ambient air at a location proximate the compressor inlet; and control means for apportioning water to the first and second sets of nozzles.

In another aspect, the invention relates to a method of augmenting gas turbine power output in a system comprising a gas turbine, a combustor and a compressor comprising a) saturating combustion air upstream of an inlet to the compressor with water to cool the combustion air to a temperature at or near the wet bulb temperature; and b) supersaturating the combustion air at a location closely adjacent the inlet to the compressor to thereby permit liquid water entrained in the combustion air to enter the compressor where it is evaporated to cool the air being compressed in the compressor.

DETAILED DESCRIPTION OF THE INVENTION

Figure 1:
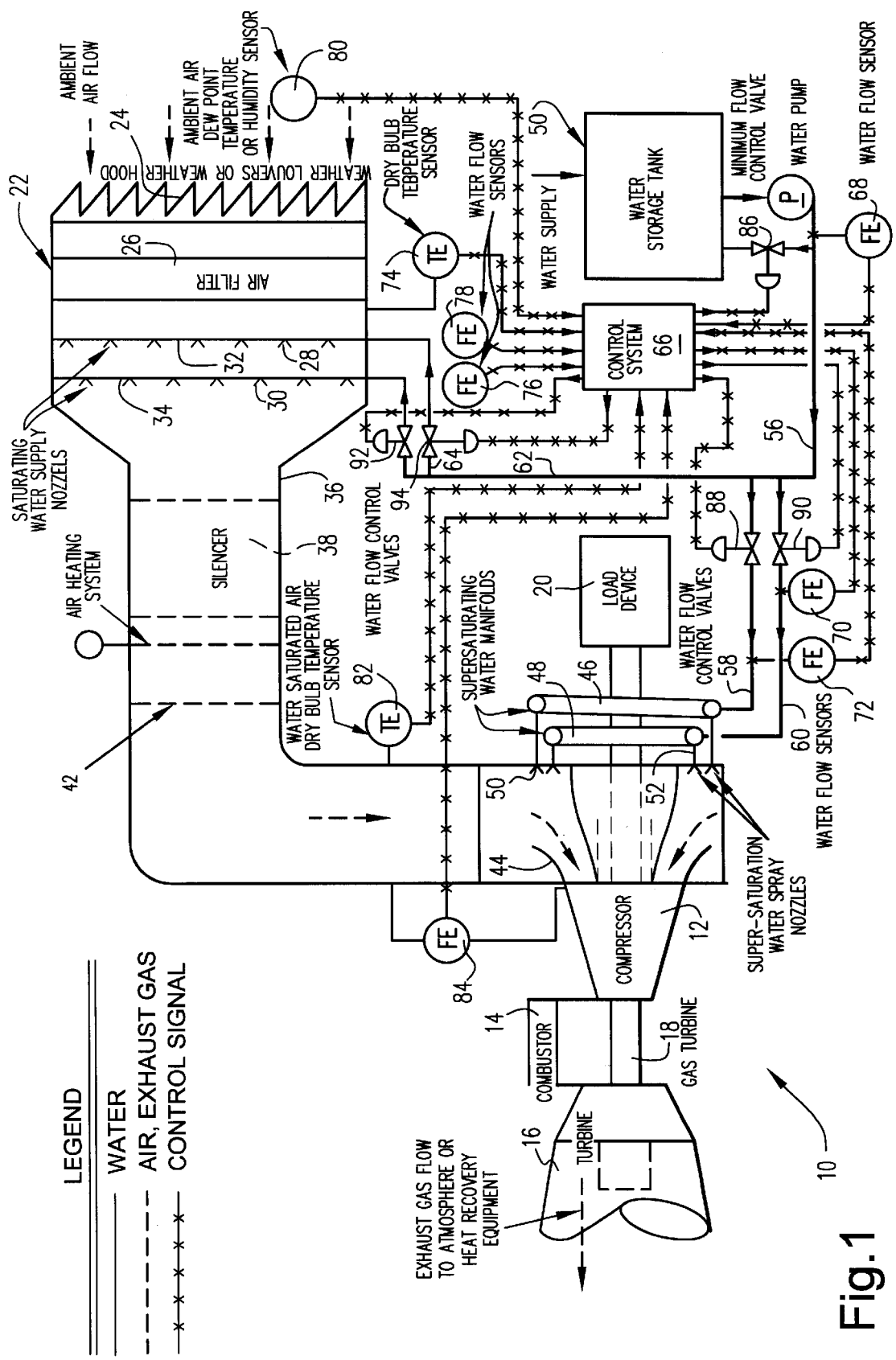
FIG. 1 is a schematic flow diagram illustrating a first exemplary embodiment of the invention.

With reference to FIG. 1, the gas turbine 10 includes a compressor 12, a combustor 14, and the turbine 16, with the compressor and turbine sharing a common rotor 18 connected to a load device (for example, a generator) 20.

The integrated intake air humidification system in accordance with this first embodiment of the invention includes intake air duct work which supplies ambient air to the inlet of the compressor 12. The duct work includes an ambient air flow inlet region 22 which may incorporate, in the direction of flow, weather louvers or a weather hood 24, an air filter 26, and a plurality of saturating water spray nozzles 28, 30 which are fixed within respective manifolds 32, 34. The inlet region 22 tapers down to a duct 36 which may incorporate a conventional silencer 38, an optional air heating system 40 (for use only at low or part load conditions in a low NOx mode) and a debris screen 42. The duct 36 feeds the air into an inlet bell mouth 44 of the compressor 12 with flow arrows indicating the flow or air into the compressor. Closely adjacent the compressor inlet bell mouth 44 along one side of the duct 36, there are a pair of supersaturation water manifolds 46 and 48, each having sets of water spray nozzles 50 and 52, respectively.

A water storage tank 54 receives water from a supply source (not shown), and supplies water via pump P to the supersaturating water manifolds 46 and 48 by means of conduits 56, 58 and 60, as well as to the saturating water manifolds 32 and 34 by means of conduits 56, 62 and 64.

A control system generally indicated at 66 (including a microprocessor and appropriate software) controls the flow of water to the supersaturating water manifolds 46, 48 as well as to the saturating water manifolds 32, 34. Included in the control system is a water flow sensor 68 which monitors water exiting the pump P, as well as water flow sensors 70 and 72 which monitor the flow of water to the manifolds 46, 48, respectively.

A dry bulb temperature sensor 74 monitors the temperature of the inlet air between the filter 26 and the manifolds 32, 34, and additional water flow sensors 76 and 78 monitor the flow of water to the saturating water spray manifolds 32, 34. An ambient air dew point temperature or humidity sensor 80 forwards temperature or humidity information to the control system 66 from a position just outside the inlet region 22. A second dry bulb temperature sensor 82 provides temperature information to the control system 66 from a location beyond the debris screen 42 but upstream of the compressor inlet bell mouth 44. A water saturated air flow sensor 84 monitors the air flow upstream of the compressor inlet 44.

Conventional valves are utilized in conjunction with the control system 66 to control the flow of water. For example, a minimum flow control valve 86 controls the water flow in conduit 56 from pump P. Similarly, flow control valves 88 and 90 control the flow of water to supersaturation manifolds 46, 48 through conduits 58 and 60. Control valves 92, 94 control the flow of water to saturation manifolds 32, 34 through conduits 62 and 64.

Figure 2:
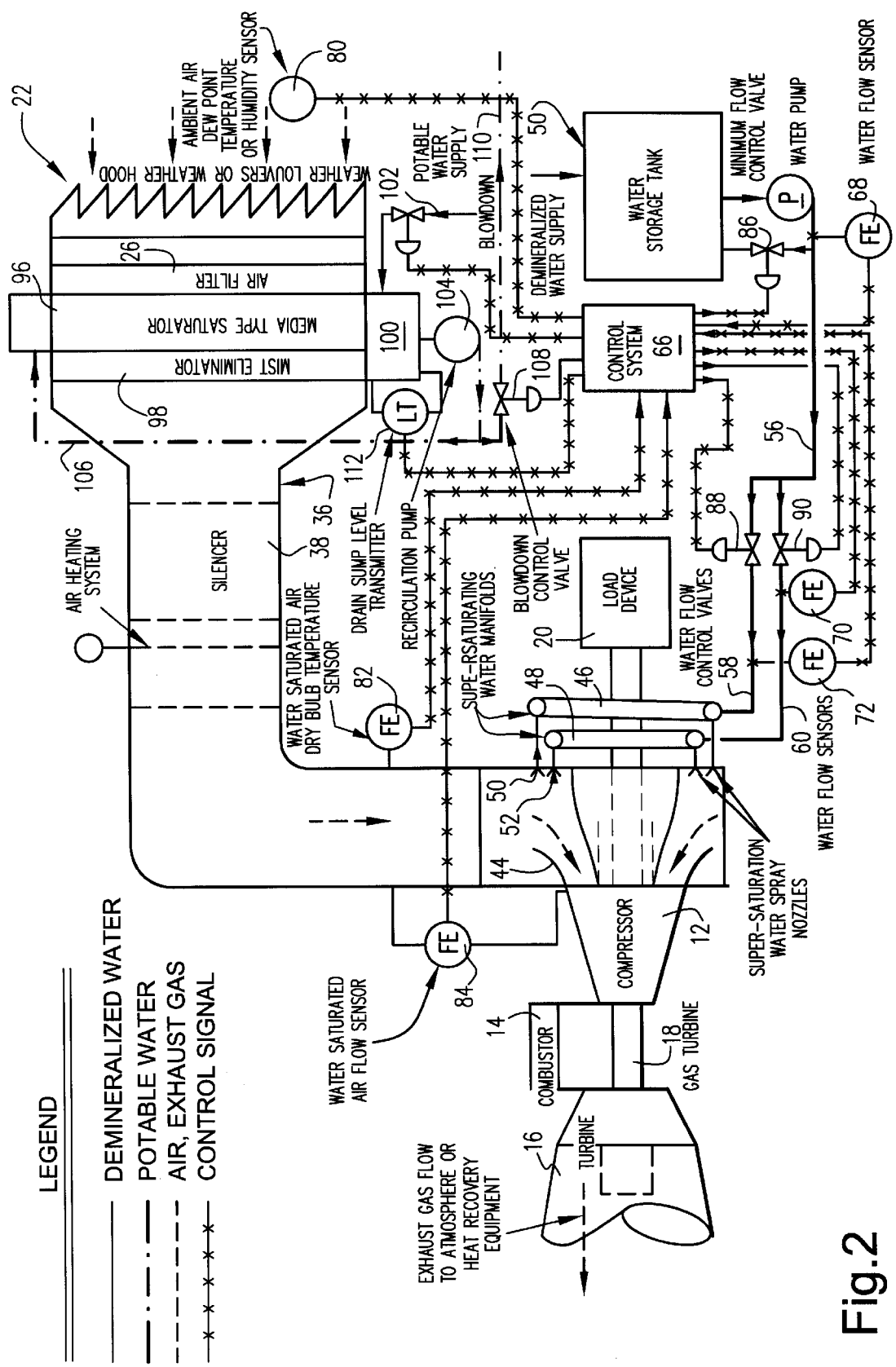
FIG. 2 is a schematic flow diagram illustrating a second exemplary embodiment if the invention.

Turning to FIG. 2, reference numerals are used which are similar to those used in FIG. 1 for corresponding components, and except where appropriate, only the structural and functional differences are discussed in detail. In this second embodiment, the integrated gas turbine intake air humidification system which eliminates the saturating water spray manifolds 32 and 34 and associated saturating water spray nozzles 28 and 30 in the inlet region 22 of the intake duct in favor of a media type saturator 96 and mist eliminator 98, located just downstream of the air filter 26. In this embodiment, potable water is supplied to a holding tank 100 from a supply conduit 102. This water is in turn supplied via pump 104 to the media type saturator 96 by means of a conduit 106. The water flow to the media saturator 96 is determined by a blow down control valve 108 controlled by the control system 66, with excess water drained via line 110. A drain sump level transmitter 112 monitors the level of the potable water within the holding tank 100, with the information transmitted to the control system 66. Water for the supersaturating water manifolds 46, 48 and respective spray nozzles 50, 52 continues to be supplied from the water storage tank 50 as in the previously described embodiment.

Figure 3:
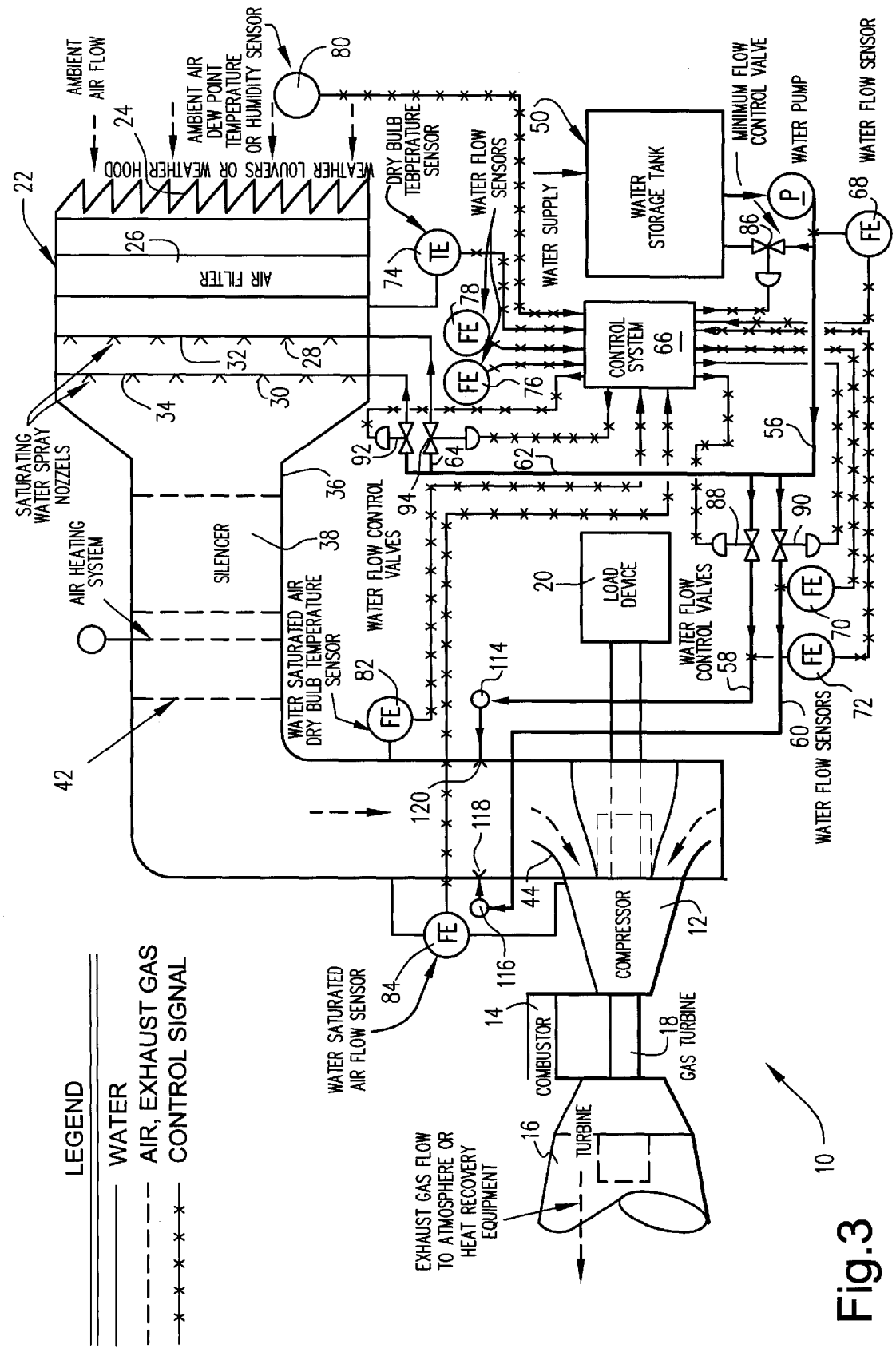
FIG. 3 is a schematic flow diagram illustrating a third exemplary embodiment of the invention.

In the FIG. 3 embodiment, where identical reference numerals are again used to indicate corresponding components, the supersaturating water manifolds 46, 48 and respective water spray nozzles 50, 52 utilized in the previously described embodiments are eliminated in favor of a supersaturating water manifold system located about the conduit 36 at a location immediately upstream of the compressor inlet bell mouth 44 (as opposed to across from the inlet). More specifically, water from the water storage tank 50 is supplied via conduits 58 and 60 to a pair of supersaturating water manifolds 114, 116, respectively. These manifolds have supersaturation water spray nozzles 118, 120 which spray atomized water into the duct 36 in a direction transverse to the air flow. The system is otherwise similar to the system described in connection with FIG. 1.

Common to all three embodiments are a number of key elements. First, the spray type evaporative nozzles 28, 30 (or media type saturator 96) are able to introduce atomized water into the gas turbine combustion air in the duct 36 well upstream of the compressor inlet bell mouth 44, and thus humidify all of the air entering the duct. The air velocity here is low, so that evaporation of the water can be achieved with minimum entrainment of water. Governed by control system 66, the saturating spray nozzles 28 and 30 apportion water to the inlet or combustion air to reduce the total air flow down to or near the wet bulb temperature to thereby humidify and cool all of the inlet air. This arrangement provides the lowest possible temperature for the air entering the compressor 12 to thereby achieve maximum gas turbine cycle temperature ratio and maximum flow of humidified air. Second, water spray nozzles 50, 52 (or 118, 120) in the gas turbine air intake duct immediately adjacent or immediately upstream of the compressor inlet bell mouth 44, also governed by the control system 66, introduce finely atomized water (or fog) to the now humidified inlet air to supersaturate it. The close proximity of nozzles 50 and 52 (or 118, 120) to the compressor minimizes the agglomeration of large droplets which could otherwise erode the compressor blades. The liquid water entrained in the humidified air at the compressor inlet bell mouth 44 is carried into the compressor blade path where it is evaporated to cool the air being compressed. This decreases the compressor power consumption and thereby increases the gas turbine power consumption and thereby increases the gas turbine power output. Third, the integrated control system optimizes the water supplied to the saturating section and supersaturating sections to achieve maximum gas turbine performance and efficiency, within the overall limits and operating parameters of the gas turbine and related components.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A gas turbine combustion air cooling system comprising:

a duct having an inlet region and an outlet, said duct adapted to supply ambient air to an inlet of a compressor;

a first set of nozzles for spraying atomized water into the ambient air at a location adjacent the duct inlet;

a second set of nozzles for spraying atomized water into the ambient air to supersaturate the ambient air at a location proximate the compressor inlet; and control means for apportioning water to said first and second sets of nozzles.

2. The cooling system of claim 1 wherein said control means operates to apportion sufficient water to said first set of nozzles to reduce the ambient air flow to a temperature at or near wet bulb temperature.

3. The cooling system of claim 1 wherein said control system operates to apportion sufficient water to said second set of nozzles to supersaturate the ambient air at the compressor inlet.

4. The cooling system of claim 1 wherein said duct inlet includes an enlarged region housing an air filter and said first set of nozzles.

5. The cooling system of claim 1 wherein said first set of nozzles are supplied with water via one or more manifolds in fluid flow communication with a storage tank.

6. The cooling system of claim 1 wherein said second set of nozzles are supplied with water via one or more manifolds in fluid flow communication with a storage tank.

7. The cooling system of claim 1 wherein said control system includes a dry bulb temperature sensor upstream of said first set of nozzles.

8. The cooling system of claim 1 wherein said control system includes a dry bulb temperature sensor downstream of said first set of nozzles.

9. The cooling system of claim 1 wherein said control means is configured to operate the cooling system at ambient air temperatures above about 40° F.

10. gas turbine combustion air cooling system comprising:
   a duct having an inlet region and an outlet adapted for connection to an inlet of a compressor;
   first means in said inlet region of said duct for saturating inlet air entering said duct;
   second means adjacent said outlet of said duct closely adjacent said inlet of the compressor for supersaturating the combustion air; and
   control means for apportioning water to said first and second means.

11. The system of claim 10 wherein said first means comprises one or more manifolds and a plurality of saturating water spray nozzles.

12. The system of claim 10 wherein said first means comprises a media saturator.

13. The system of claim 10 wherein said control system operates to apportion sufficient water to said first set of nozzles to reduce the ambient air flow to a temperature at or near wet bulb temperature.

14. The cooling system of claim 1 wherein said control system operates to apportion sufficient water to said second set of nozzles to supersaturate the ambient air at the compressor inlet.

15. In a gas turbine system including a gas turbine, a combustor and a compressor for feeding combustion air to said combustor, a cooling system for ambient air to be supplied to said compressor and to said combustor; said cooling system comprising a duct having an inlet and an outlet, said outlet connected to an inlet of the compressor;
   a first set of nozzles for spraying atomized water into the ambient air at a location adjacent the duct inlet;
   a second set of nozzles for spraying atomized water into the ambient air to supersaturate the ambient air at a location proximate the compressor inlet; and
   control means for apportioning water to said first and second sets of nozzles.

16. A method of augmenting gas turbine power output in a system comprising a gas turbine, a combustor and a compressor comprising:
   a) saturating combustion air upstream of an inlet to the compressor with water to cool the combustion air to a temperature at or near the wet bulb temperature; and
   b) supersaturating the combustion air at a location closely adjacent the inlet to the compressor to thereby permit liquid water entrained in the combustion air to enter the compressor where it is evaporated to cool the air being compressed in the compressor.

* * * * *